(12) United States Patent
Dementhon

(10) Patent No.: US 10,329,158 B2
(45) Date of Patent: Jun. 25, 2019

(54) AMMONIA STORAGE STRUCTURE AND ASSOCIATED SYSTEMS

(71) Applicant: AAQIUS & AAQIUS SA, Geneva (CH)

(72) Inventor: Jean-Baptiste Dementhon, Paris (FR)

(73) Assignee: AAQIUS & AAQIUS SA, Geneva (CH)

( * ) Notice: Subject to any disclaimer, the term of this patent is extended or adjusted under 35 U.S.C. 154(b) by 519 days.

(21) Appl. No.: 14/783,595

(22) PCT Filed: Apr. 11, 2014

(86) PCT No.: PCT/EP2014/057448
§ 371 (c)(1),
(2) Date: Mar. 10, 2016

(87) PCT Pub. No.: WO2014/167128
PCT Pub. Date: Oct. 16, 2014

(65) Prior Publication Data
US 2016/0185612 A1 Jun. 30, 2016

(30) Foreign Application Priority Data

Apr. 12, 2013 (FR) ..................................... 13 53368

(51) Int. Cl.
*C01C 1/00* (2006.01)
*F01N 3/20* (2006.01)
(Continued)

(52) U.S. Cl.
CPC .......... *C01C 1/006* (2013.01); *B01D 53/9431* (2013.01); *B01J 20/046* (2013.01);
(Continued)

(58) Field of Classification Search
USPC .................. 60/274, 286, 295, 297, 301, 303
See application file for complete search history.

(56) References Cited

U.S. PATENT DOCUMENTS 6,928,807 B2 * 8/2005 Jacob ................. B01D 53/8631
60/286
7,418,957 B2 * 9/2008 Abe .................... F02D 41/1494
123/697

(Continued)

FOREIGN PATENT DOCUMENTS

DE 102009060285 A1 6/2011
EP 2236784 A1 10/2010
(Continued)

*Primary Examiner* — Binh Q Tran
(74) *Attorney, Agent, or Firm* — Womble Bond Dickinson (US) LLP

(57) ABSTRACT

The disclosure relates to an ammonia storage structure in particular for the selective catalytic reduction of nitrogen oxides in the exhaust gases of combustion vehicles, where the structure includes at least one element for storing a gas such as ammonia, in the form of a porous matrix, with which an irrigating device the storage element are associated. The disclosure also relates to an ammonia storage and removal system of a vehicle that includes a storage chamber receiving such a storage structure, a selective catalytic reduction system for internal combustion engine exhaust gases, including such an ammonia storage system and to a module for feeding ammonia into the exhaust gases, and, finally, to a monolithic porous matrix for storing a gas, where the matrix contains the irrigation device in the interior thereof, in order to promote the sorption/desorption of the gas in the matrix.

29 Claims, 9 Drawing Sheets

(51) Int. Cl.

| | | |
|---|---|---|
| *B01D 53/02* | (2006.01) | |
| *B01D 53/94* | (2006.01) | |
| *B01J 20/04* | (2006.01) | |
| *B01J 20/28* | (2006.01) | |
| *B01J 20/30* | (2006.01) | |
| *F17C 11/00* | (2006.01) | |

(52) U.S. Cl.
CPC ..... *B01J 20/2805* (2013.01); *B01J 20/28026* (2013.01); *B01J 20/28042* (2013.01); *B01J 20/28052* (2013.01); *B01J 20/3007* (2013.01); *B01J 20/3035* (2013.01); *F17C 11/00* (2013.01); *B01D 53/02* (2013.01); *B01D 2251/2062* (2013.01); *B01D 2253/112* (2013.01); *B01D 2257/404* (2013.01); *B01D 2258/012* (2013.01); *F01N 3/2066* (2013.01); *F01N 2610/06* (2013.01); *F01N 2610/1406* (2013.01); *Y02A 50/2325* (2018.01)

(56) References Cited

U.S. PATENT DOCUMENTS

| | | | |
|---|---|---|---|
| 7,662,746 B2 | 2/2010 | Yaghi et al. | |
| 8,551,219 B2 * | 10/2013 | Johannessen | B01D 53/90 206/0.7 |
| 9,010,091 B2 | 4/2015 | Johannessen et al. | |
| 9,103,260 B2 * | 8/2015 | Maguin | F01N 3/2066 |
| 9,687,782 B1 * | 6/2017 | Miao | B01D 53/8634 |
| 2005/0247050 A1 | 11/2005 | Kaboord et al. | |
| 2006/0196560 A1 * | 9/2006 | Nygren | F01N 3/2066 137/593 |
| 2007/0180998 A1 | 8/2007 | Arnold et al. | |
| 2009/0101580 A1 | 4/2009 | Lubda et al. | |
| 2009/0123361 A1 | 5/2009 | Johannessen et al. | |
| 2012/0231949 A1 * | 9/2012 | Svagin | C01C 1/006 502/400 |
| 2013/0287656 A1 | 10/2013 | Duggan et al. | |
| 2014/0205529 A1 | 7/2014 | Kindbeiter et al. | |

FOREIGN PATENT DOCUMENTS

| | | | |
|---|---|---|---|
| JP | 58-099104 | 6/1983 | |
| JP | 08-504929 | 5/1996 | |
| JP | 2007-170604 | 7/2007 | |
| JP | 2012-052476 A | 3/2012 | |
| JP | 2014-521905 | 8/2014 | |
| WO | WO-2008/119492 A1 | 10/2008 | |
| WO | WO2013/020924 * | 2/2013 | F01N 3/20 |

\* cited by examiner

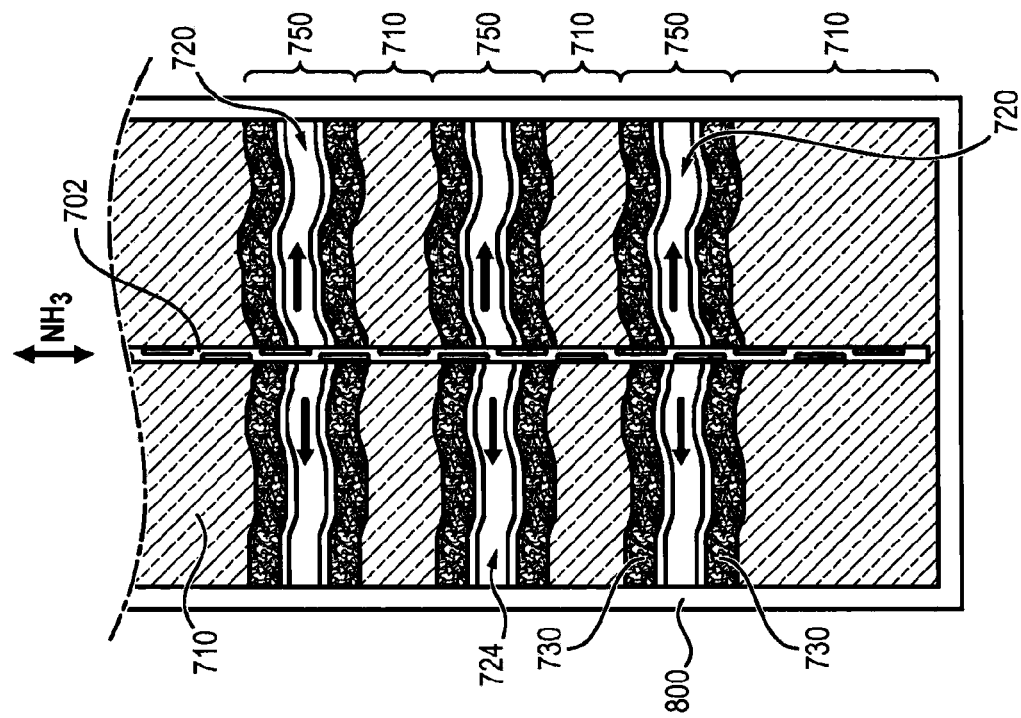
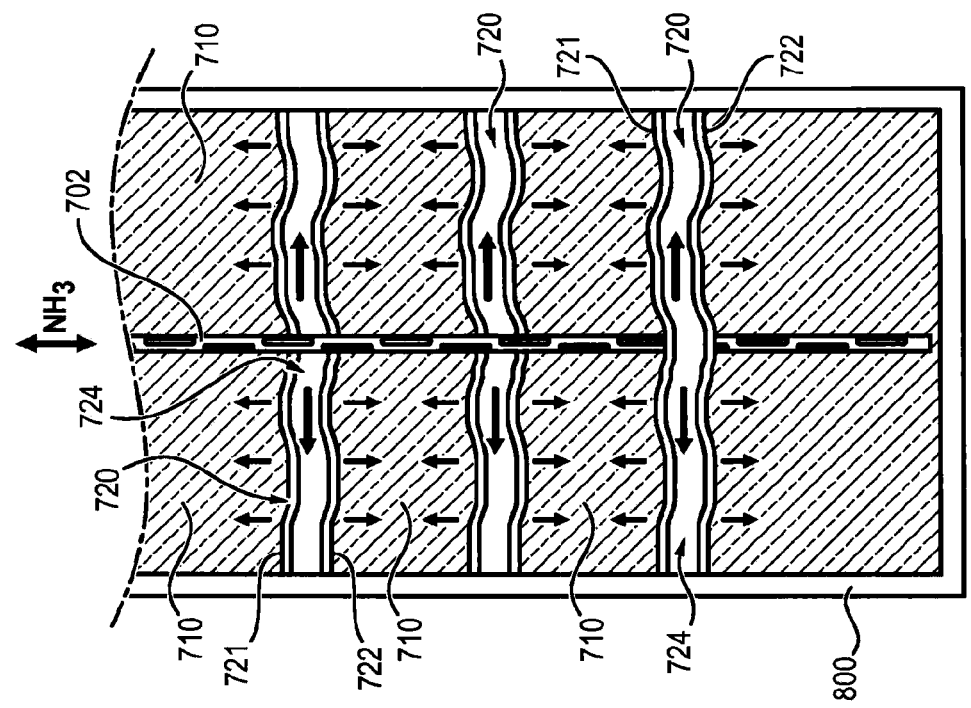

AMMONIA STORAGE STRUCTURE AND ASSOCIATED SYSTEMS

CROSS-REFERENCE TO RELATED APPLICATIONS

This application is a National Phase Entry of International Patent Application No. PCT/EP2014/057448, filed on Apr. 11, 2014, which claims priority to French Patent Application Serial No. 1353368, filed on Apr. 12, 2013, both of which are incorporated by reference herein.

FIELD OF THE INVENTION

The invention generally relates to the storage of gas in solids, allowing lower storage pressures than those encountered with storage in gas form, for the purpose of diverse applications such as the use of hydrogen in a fuel cell intended for the production of electricity, or such as ammonia in applications for the reduction of nitrogen oxides NOx via selective catalytic reduction (SCR), in particular for the reduction of polluting emissions by internal combustion engines, diesel engines in particular.

BACKGROUND

Emissions of transport-related pollutants have been a leading force driving progress in industry for nearly thirty years. The progressive increase in the severity of emission limits for the four regulated pollutants (CO, HC, $NO_x$, particles) has allowed a significant improvement in air quality in particular in large urban areas.

The ever increasing use of motor vehicles requires continued efforts for a further reduction in these pollutant emissions. Reduced tolerance for European emission thresholds is expected in 2014 as part of steps for the entry into force of the Euro6 standard. Such measures set out to reduce local pollution. To have available highly efficient depolluting technologies under all driving conditions is therefore a major challenge for the transport industry. Within this context, the reduction of lean mixture nitrogen oxides ($NO_x$) i.e. comprising excess oxygen is a major challenge associated with complex issues.

In addition, fuel consumption, having a direct link with $CO_2$ emissions, has become a major concern for the automobile industry within a few years. Regulations were introduced in Europe after 2012 on $CO_2$ emissions of private vehicles. It is henceforth accepted that this limit will be regularly lowered over the coming decades. The reduction of $CO_2$ emissions has therefore taken hold as the new driving force for growth of the entire transport industry. This twofold problem of reducing local pollution ($NO_x$) and reducing fuel consumption ($CO_2$) is particularly difficult for Diesel engines for which the lean mix combustion is accompanied by $NO_x$ emissions difficult to treat.

Within this context the post-treatment technology SCR ("Selective Catalytic Reduction") is used both for private vehicles and for goods vehicles. It is thus possible to focus engine operation on optimal yield, the strong $NO_x$ emissions subsequently being treated in the exhaust by the SCR system allowing highly efficient NOx reduction.

To allow the implementing of SCR technology, a reducing agent must be placed on board the vehicle for the reduction of nitrogen oxides. The system currently chosen for heavy goods vehicles uses urea in an aqueous solution as reducing agent. When injected into the exhaust, the urea decomposes to ammonia ($NH_3$) under the effect of the temperature of the exhaust gases and allows $NO_x$ reduction on a specific catalyst. One adopted, standardised urea solution for the functioning of current SCR systems in series is referenced AUS32 (the trade name in Europe being Adblue®).

This most efficient method suffers from a certain number of drawbacks however. It has limited efficacy under cold conditions, whereas this type of situation occurs in several cases in particular for city buses. The urea tank is of large volume and weight typically 15 to 30 L for a private car, 40 to 80 L for a heavy goods vehicle. Such volume leads to complex integration in the vehicle, all the more so for a small vehicle. The depollution cost is therefore high and the excess weight is detrimental to the vehicle's fuel consumption and hence to $CO_2$ emissions.

The option of storing ammonia in gaseous form under pressure has numerous disadvantages in terms of compactness and operating safety, and various alternative storage methods have been developed. In one of these methods the gas is absorbed inside a material e.g. salt. The storage of ammonia is then obtained within the salt through the formation of a chemical complex of ammoniacate type. The storage of ammonia in the form of absorbed gas has the advantage of a gain in volume compared with an aqueous solution, an increase in cold condition efficacy and greater compactness of the mixing point with exhaust gases in particular.

Nevertheless the implementing of this technology involves a certain number of difficulties such as:

The delivery of the ammonia stored in the matrix and intended to be injected into the exhaust is obtained under heating, most often electric heating. The extent of said heating is designed so that it is possible to reach a sufficient temperature to attain a saturation pressure of the gas (which corresponds to the material used) sufficient to ensure injection into the exhaust. Typically, it is sought to reach ammonia pressures of between 2 and 3 absolute bars at the orifice connecting the inside of the cartridge to the metering system. Once this temperature is reached, there is a time interval before obtaining ammonia ready for injection, a time interval which is dependent first on the desorption enthalpy of the gas (chemical time) and secondly on the diffusion time of the gas through the porous medium formed by the storage matrix. One means to shorten this time interval, for compatibility with motor vehicle specifications, is to boost the electric heating power to the detriment of fuel consumption and hence of the $CO_2$ impact of the technology.

Another limitation to the system lies in the fact that once the outward flow of ammonia (towards the exhaust) is ensured, the maintaining of this flow at a sufficient level (to ensure stoichiometry with the flow of NOx to be removed) will be limited by the difference between the outward injection rate of the ammonia and the refeeding of the void areas (porosity of the storage material), this re-feeding being limited by desorption enthalpy and resistance to diffusion of the porous medium (substantiated by characteristic head loss of flow in a porous medium). It is to be noted that the time of this maintained gas flow will be longer the more the approval standard for vehicles regarding NOx emissions will tend towards measurement under real driving emissions (RDE), contrary to measurements under dynamometer testing conditions using a specific driving cycle.

The two previously mentioned limits to the proper functioning of the system relate to the delivery of the gas from its "condensed" state inside the storage material to the dispensing and feed system directed towards the exhaust. Conversely, when the cartridge is empty it is dismounted exchanged for a full cartridge and sent for refill to a station provided for this purpose. The refill time is an important parameter of the cost of the operation.

It is noted that in each of the above-mentioned cases, the compacting of the ammonia storage elements, nevertheless favourable for a reduction in the space taken up by a given quantity of ammonia, is obtained to the detriment of the transfer time of the ammonia from the core of the cartridge towards the injection network, and the transfer time from the ammonia filling station towards the core of the storage matrix. The present invention sets out to facilitate the dispensing of ammonia to every region of the storage matrix.

SUMMARY

The present invention, for a storage solution such as discussed above, is intended to improve the transfer of ammonia from the core of the cartridge or towards this core, and thereby to reduce all or some of the above-mentioned drawbacks. With this in view, an ammonia storage structure is proposed in particular for selective catalytic reduction of nitrogen oxides in the exhaust gases of combustion vehicles, characterized in that it comprises at least one storage element of a gas such as ammonia in the form of a porous matrix, with which irrigation means of the storage element are associated.

Some preferred but non-limiting aspects of this structure are the following, taken alone or in any technically compatible combination:

at least part of the irrigation means is arranged inside the storage element;

at least part of the irrigation means is arranged inside an irrigation element adjacent the storage element;

the irrigation means comprise one or more channels essentially devoid of porous material;

the channels comprise tubes, the wall thereof being provided with orifices;

the channels comprise tubes, the wall thereof being porous;

the irrigation means comprise one or more channels formed in a porous matrix and defined by regions of the porous matrix having greater porosity than the remainder of the matrix;

said porous matrix in which the channel(s) are formed is the matrix of the storage element;

said porous matrix in which the channel(s) are formed is the matrix of an intercalary element between two storage elements;

the porous matrix in which the channel(s) are formed is rigid;

the porous matrix in which the channel(s) are formed is in powder form;

the irrigation means comprise at least two channels in a branched arrangement;

the irrigation means comprise a film formed by two porous membranes and delimiting a space therebetween;

the irrigation means comprise at least one flexible membrane forming a flexible duct;

the irrigation means comprise two plates, or two pairs of plates, provided with orifices and spaced apart, intercalated between two gas storage elements;

the irrigation means extend from a main channel passing through the gas storage element(s).

According to a second aspect of the invention, a construction module of a structure according to the invention is proposed, said module comprising irrigation means configured to be connected to the irrigation means of at least one other module so as to form the storage structure. According to a third aspect of the invention, a method for manufacturing a module according to the preceding claim is proposed, comprising:

a step to compress a powder inside a mould, to form a coherent block; and a second step to form a network of irrigation channels inside the coherent block to obtain the module.

According to a second aspect of the invention, a vehicle system for storing and releasing ammonia is proposed comprising a storage chamber, characterized in that the storage chamber comprises a storage structure such as defined above.

Preferred but non-limiting aspects of this system are the following:

the storage structure is arranged in layers having symmetry of revolution;

the structure has a cut-out along the axis of the symmetry of revolution, in communication with the irrigation means of the structure.

According to the invention, provision is also made for a selective catalytic reduction system for exhaust gases of an internal combustion engine, characterized in that it comprises an ammonia storage system such as defined above and an injection module to inject ammonia into the exhaust gases. Finally, a monolithic porous matrix is proposed for storing a gas, characterized in that it houses irrigation means to promote the sorption/desorption of gas in the matrix.

BRIEF DESCRIPTION OF THE FIGURES

Other characteristics, objectives and advantages of the invention will become apparent in the following description of one embodiment. In the appended drawings:

FIGS. 6a and 6b illustrate one architecture of the storage matrix called stack architecture i.e. a stack of storage elements inside a container and delimited by intercalary elements ensuring the feeding of gas to every layer;

DETAILED DESCRIPTION

1) General

Figure 1:
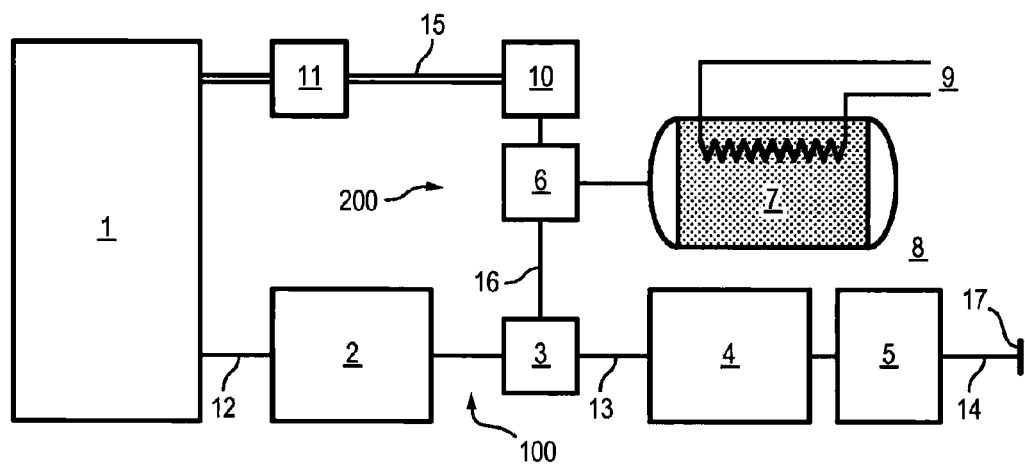
FIG. 1 illustrates a heat engine equipped with a SCR post-treatment system via injection of ammonia according to one embodiment of the invention.

In the following paragraph, more details are given on the chemical process of ammonia sorption in a salt. In a storage structure, a salt is selected from among alkaline-earth chlorides. In particular, the salt is selected from among the following compounds: $SrCl_2$, $MgCl_2$, $BaCl_2$, $CaCl_2$, $NaCl_2$. The storage of ammonia is based on a reversible solid-gas reaction of the type:

$$<Solid\ A>+(Gas) \leftrightarrows <Solid\ B>$$

With the alkaline-earth chlorides ammonia forms coordination complexes also called ammoniacates. This phenomenon is known to the person skilled in the art.

For example, the reactions of ammonia with strontium chloride are:

$$SrCl_2(s)+NH_3(g) \leftrightarrows Sr(NH_3)Cl_2(s)$$

$$Sr(NH_3)Cl_2(s)+7NH_3(g) \leftrightarrows Sr(NH_3)_8Cl_2(s)$$

Similarly, the unique reaction of ammonia with barium chloride is:

$$BaCl_2(s)+8NH_3(g) \leftrightarrows Ba(NH_3)_8Cl_2(s)$$

The chemical absorption of the ammonia ligand by the absorbent $SrCl_2$ and $BaCl_2$ leads to an electron transfer between the solid and the gas which translates as chemical bonds between $NH_3$ and the outer layer of the atoms of $SrCl_2$ and $BaCl_2$. The gas enters into the entire mass of the structure of the solid via a diffusion process. This reaction is fully reversible, absorption being exothermal and desorption being endothermal.

To facilitate exchange between the crystal core in which the ammonia is absorbed and the outside, the storage material (e.g. $SrCl_2$ and $BaCl_2$) is organised into a porous medium for example in powder form whether or not compressed, or in the form of a rigid press cake obtained by adhesion of the powder particles to one another. The salt thus organised in porous form is integrated in a storage chamber made of various materials, metal, plastic, composite for example. This chamber often called a cartridge is then integrated in the vehicle either alone or in parallel with others and connected to a metering system to ensure the conveying and controlling of a flow of ammonia towards the exhaust line, a flow rate calculated as a function of the amount of nitrogen oxides to be reduced.

The advantages of this type of storage compared with urea in aqueous solution are numerous. Storage within a salt allows a significant reduction in the weight and volume of the storage reservoir. It also provides a benefit in terms of $CO_2$ balance due to the decreased weight of the reductant to be placed in board for a given ammonia endurance time. Savings are made with respect to the amount of additional water required to dilute urea in the conventional so-called liquid SFR configuration. Additionally, this type of storage allows the cold absorption of $NO_x$ with improved efficacy. This type of storage offers a potential reduction in manufacturing costs since the ammonia feed and injection system can be simplified.

To limit the volume of the storage chamber, motor vehicle manufacturers give priority to replacement of the storage chamber, for example during engine maintenance, at an oil change or when filling the fuel tank. The amount of ammonia on board a private vehicle will be in the order of 6 kg for an equivalent of 16 L of urea solution of AUS32 type, which allows an endurance time of a private vehicle lasting between two oil changes of the vehicle.

Once the storage chamber e.g. a cartridge is empty, it is replaced by a full cartridge e.g. at the time of vehicle maintenance, the empty cartridge being sent to a filling station. A cartridge may therefore undergo ten to fifteen emptying/filling cycles. Depending on vehicle manufacturer strategy, the frequency of storage chamber exchange and the conditions of exchange can be modulated.

2) Architecture of the Storage Matrix

In one embodiment, the architecture of the storage matrix implanted inside a cartridge is a stack of storage elements previously impregnated with ammonia, compressed within a container or receptacle. More elaborate architectures of the storage matrix, in particular with the intercalating of elements possibly having diverse functionalities positioned between the storage elements properly so-called, allowing optimisation of the performance of the whole.

Thus, between storage elements (in powder or rigid elements whether or not compressed) there may be intercalated different elements intended not for actual storage but possibly having functions such as an increase in heat transfer, the damping of mechanical stresses (e.g. compressible elements such as cakes of expanded natural graphite, partly compressed). Said architecture allows greater versatility in terms of choice of storage material(s), container material, possible filling with ammonia once the container is closed (either for a cartridge when first mounted or for reconditioning thereof at periodical refill) and for optimisation of the key performance of the system such as energy cost for the production of ammonia in gaseous form, or the maintaining over time of the integrity of the gas storage materials for example. Said architecture therefore comprises the stacking or association of several elements or "bricks", e.g. inside a cartridge paying heed to a cylindrical geometry, these elements possibly being in the form press cakes stacked from bottom to top inside the cartridge.

This provides large flexibility in the design of the assembly, via different specifications from one brick to another, allowing heterogeneity of physicochemical properties from one cartridge region to another, to the benefit of macroscopic performance levels of the assembly on the basis of intelligent design. The parameters which may vary from one brick to another are absorption enthalpy, saturation vapour pressure (chemical parameters related to type of salt), void rate (physical parameters such as powder particle size, brick compression level), thermal conductivity, elasticity for example.

3) Heating and Metering

The storage matrix integrated inside a cartridge is connected to the metering system via an orifice provided at one end of the cartridge. To allow control over gas pressure, the first step for creating a sufficient flow rate to feed the depollution system i.e. diffusion of ammonia from the core of the crystal forming the storage material towards the outlet orifice, a heating device based for example on electric resistances is associated with the cartridge and connected to a control system. This device is in the form of a hot mat for example surrounding the outside of the cartridge. Another possibility is to integrate the resistive element inside a channel integral with the cartridge allowing good distribution of heat inside the cartridge. For a cylindrical cartridge, said channel delimits a coaxial region centred on the axis of the cartridge.

4) System

FIG. 1 schematically illustrates a heat engine equipped with a SCR post-treatment system via ammonia injection. The heat engine may be an internal combustion engine e.g. a diesel engine or a lean mixture petrol engine such as a direct injection engine with stratified mixture.

An engine 1 is driven by an electronic computer 11. At the outlet of the engine, exhaust gases 12 are directed towards a depollution system 2. The depollution system 2 may comprise an oxidation catalyst or a three-way catalyst. The depollution system may further comprise a particle filter.

Ammonia 16 is injected into an exhaust circuit 100 of the engine and mixed with the exhaust gases by an injection module 3 arranged downstream of the depollution element 2 for example to form an ammonia/exhaust gas mixture 13. The ammonia/exhaust gas mixture 13 then passes through a SCR catalyst 4 which allows the reducing of nitrogen oxides NOx by the ammonia. Additional post-treatment elements 5 can be positioned after the SCR catalyst. The additional elements 5 may comprise a particle filter or oxidation catalyst. The exhaust gases are therefore in the form of depolluted exhaust gases 14 at the outlet of the additional elements 5. The depolluted exhaust gases are then directed towards an exhaust outlet 17. The exhaust 100, in an arrangement from upstream on the engine side 1 to downstream on the outlet side 17 therefore comprises: the depollution element 2, injection module 3, SCR catalyst 4 and additional elements 5.

To ensure feeding and metering of the ammonia 16 at the inlet to the injection module 3, the system comprises an ammonia storage chamber 8 containing a storage structure 7 able to have its temperature controlled by a heating device 9. The heating device 9 may comprise for example an electric resistance or a heat exchanger fed with a heat-exchange fluid such as the engine cooling liquid.

The storage chamber 8 is connected to a device 6 controlling the pressure of the chamber and the metering of ammonia towards the injection module 3. This device 6 can be driven by a dedicated electronic controller 10 connected to the engine's electronic computer 11. The system therefore comprises an ammonia feed circuit 200 comprising from upstream to downstream in the direction of circulation of the ammonia; the storage chamber 8, the device 6 and the injection module 3 into the exhaust 100. In one alternative configuration, not illustrated, the device 6 may be directly driven by the engine computer 11.

With regard to the arrangement inside the chamber 8, several solutions can be envisaged. According to a first possibility, an ammonia-saturated salt is prepared upstream, this salt being compressed into cakes of shape compatible with the container and integrated by stacking within the container.

Another approach is to integrate ammonia-free material within the container in the chosen form selected from among various forms such as powder, rigid cakes whether or not compressed, the ammonia being injected into the cartridge once the material has been integrated. One advantage of this approach lies in particular in the fact that the ammonia filling operation at the first mounting is identical to the reconditioning operation of said cartridges after maintenance operations. In this latter case, the storage matrix may have a particular stacking architecture whereby gas storage elements formed of salts for example are intercalated with intercalary elements imparting specific functionalities to the assembly such as increased thermal conductivity or damping of expansion.

5) Irrigation Means

The feeding of gas from outside to inside the cartridge (storage matrix) or from the storage matrix towards the metering system allowing the conveying and control of the required flow rate of ammonia to the exhaust, is obtained via an orifice provided at one end of the cartridge. The dynamics of ammonia delivery at this orifice and the dynamics of ammonia integration inside the matrix during reconditioning are limited by the thermodynamics of gas absorption/desorption firstly (absorption/desorption enthalpy) and secondly by transfer via gas diffusion through the porous medium formed by the storage material such as described above, this transfer being all the more restricted the lower the porosity of the material i.e. first the material is highly compressed to obtain greater storage density and secondly the saturation level of ammonia in the salt is high. For the purpose of maintaining high storage density whilst facilitating the dynamics of ammonia transfer from one region to another of the storage matrix towards the metering orifice or the reverse pathway, it is proposed to integrate irrigation means within the porous matrix, these means being connected to the orifice of the cartridge and serving different regions of the matrix.

FIGS. 2 to 6 illustrate particular embodiments of this distribution network. FIGS. 2a, 2b and 2c illustrate a particular embodiment of a network 300 of internal channels inside the storage matrix, based on miniature ducts 302 running inside the material. With reference to FIG. 2a, these ducts 302 are hollow and delimited by a wall in material permeable to ammonia gas, this wall either being pierced with a series of orifices over its length (on the left in the Figure) or being porous (on the right in the Figure) so as to allow the transfer of ammonia from a duct towards the core of the matrix, and reciprocally.

Figure 2A:
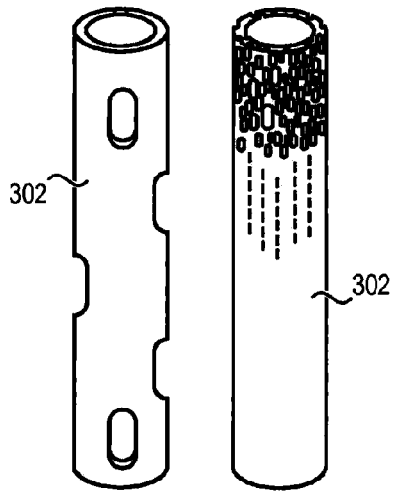
FIGS. 2a, 2b and 2c illustrate a particular embodiment of an internal channel network in the storage matrix based on mini-ducts running inside the material.
Figure 2B:
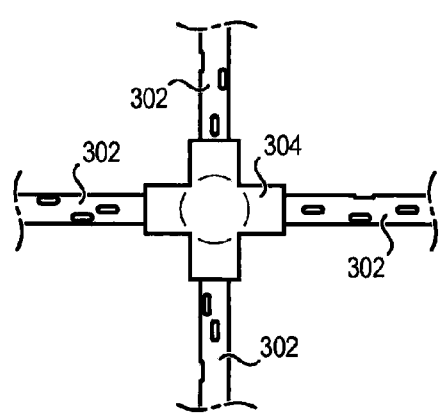
Figure 2C:
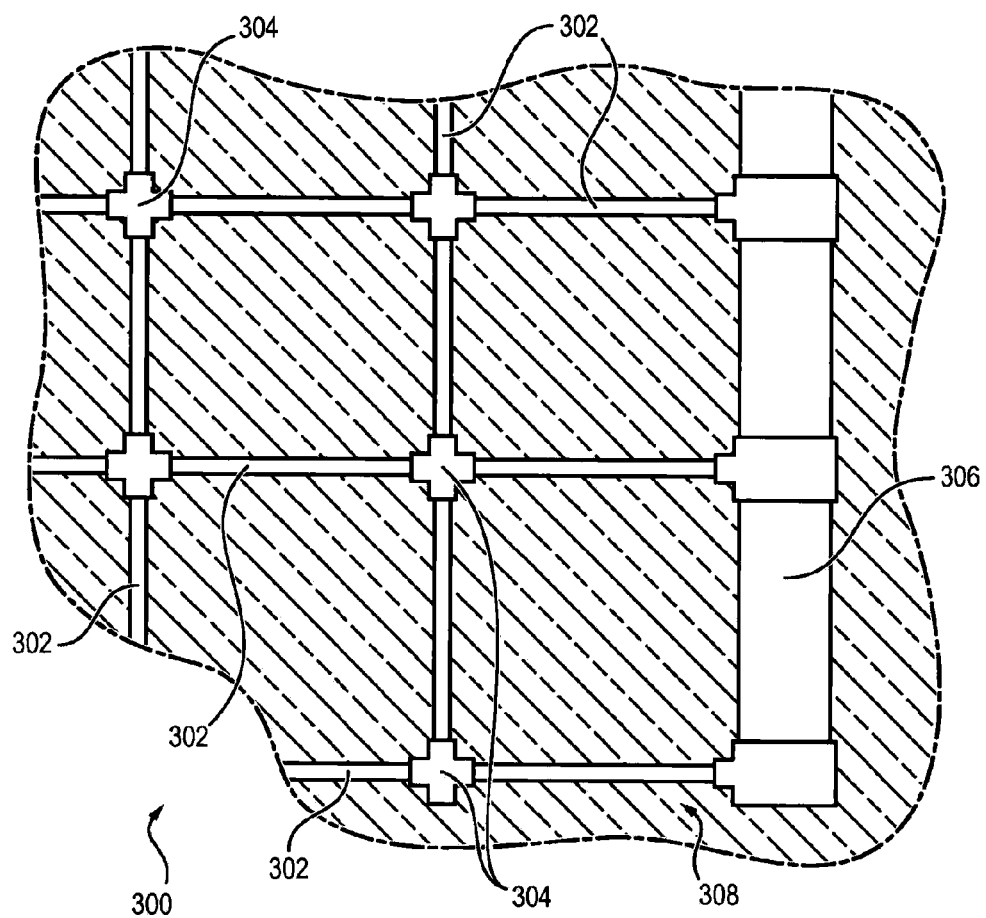

FIG. 2b illustrates two ducts 302 crossing over one another at a cross-shaped junction element 304 made in suitable material resistant to the medium and prevailing conditions. FIG. 2c illustrates a part of the gas storage matrix 308 crossed by an irrigation network comprising a series of ducts 302 and junction elements 304, the network being connected to a gas inlet/outlet duct 306.

Figure 3A:
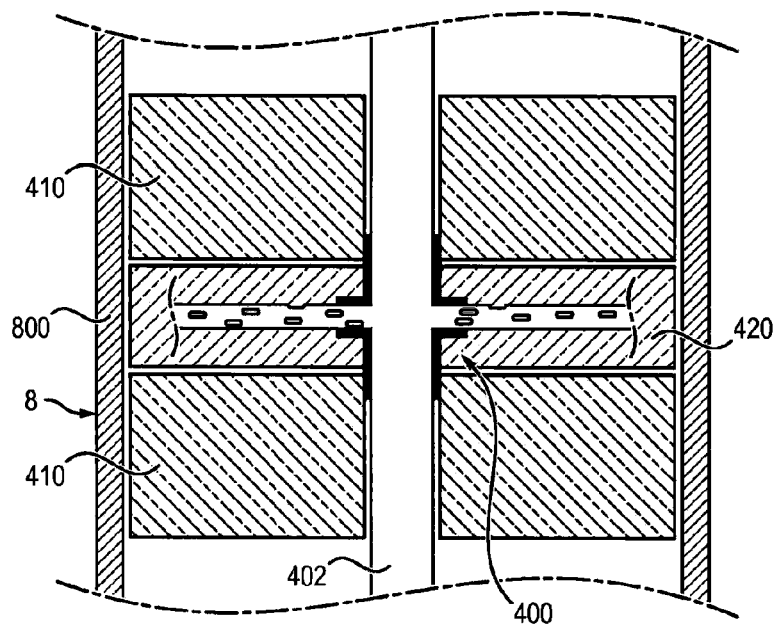
FIGS. 3a, 3b and 3c illustrate the same type of channel network formed of a main channel which passes through all the storage regions from the inlet/outlet of the cartridge and is subdivided into a secondary feed network housed by intercalary elements separating the storage elements.
Figure 3B:
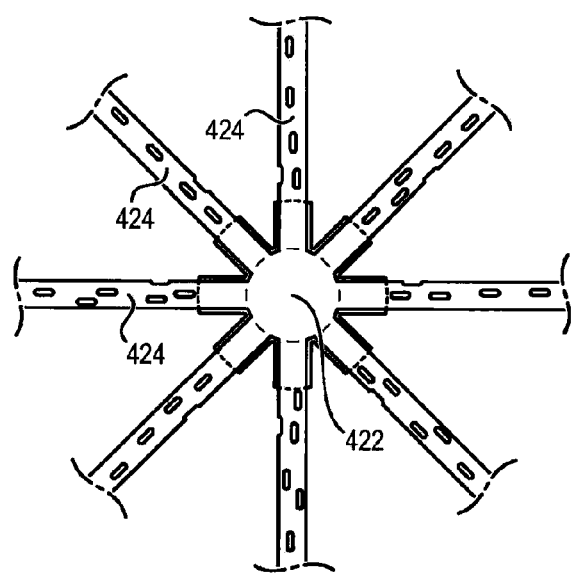
Figure 3C:
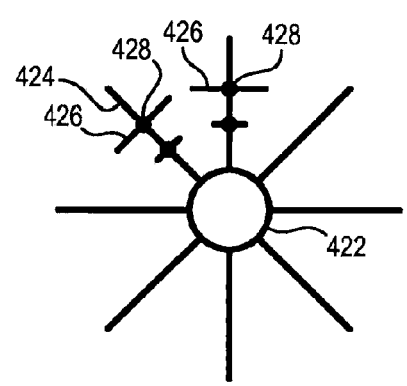

FIGS. 3a, 3b and 3c illustrate another embodiment of an irrigation network 400 comprising a main channel 402 extending along an axis of a container 8 receiving a stack of press cakes held in position by a wall 800 of the container. These cakes comprise storage elements 410 alternating with intercalary elements 420 chiefly having an irrigation role between the main channel 402 and the storage elements 410.

For this purpose, and as schematised in FIG. 3b, these intercalary elements which may also be formed of porous matrixes, comprise a star-shaped network of irrigation channels 424 starting from a central opening 422 taking part in the main channel 402. These intercalary elements therefore form a secondary irrigation network starting from the main channel 402, to facilitate circulation of gas towards and from the storage elements 410. FIG. 3c illustrates a variant in which irrigation channels 424 are themselves connected to other channels 426 via cross-shaped connection elements 428.

Figure 4:
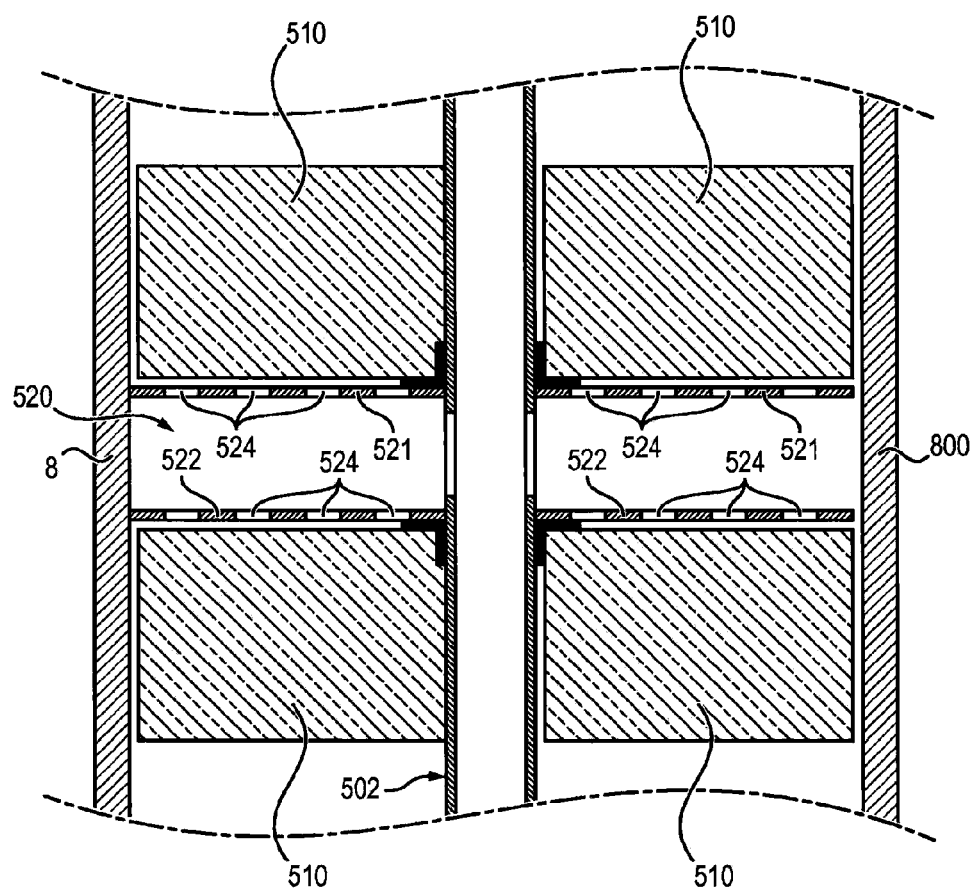
FIG. 4 illustrates a particular embodiment of the gas feed system inside the structure, based on an intercalary element between two storage regions, formed of plates pierced with holes connected to a main feed channel connecting the inlet/outlet of the cartridge.

FIG. 4 illustrates a variant of the irrigation system of the gas storage structure in FIGS. 3a, 3b and 3c, based not on a solid intercalary element but on an intercalary space 520 essentially free of solid material and delimited by two solid plates 521, 522 spaced apart from one another and held in position for example by crimping on a duct 502 forming the main channel. Each plate 521, 522 is provided with a series of holes 524 ensuring communication between the space 520 and the porous storage matrix formed by the storage elements 510 equivalent to the elements 410 in FIG. 3a.

Figure 5B:
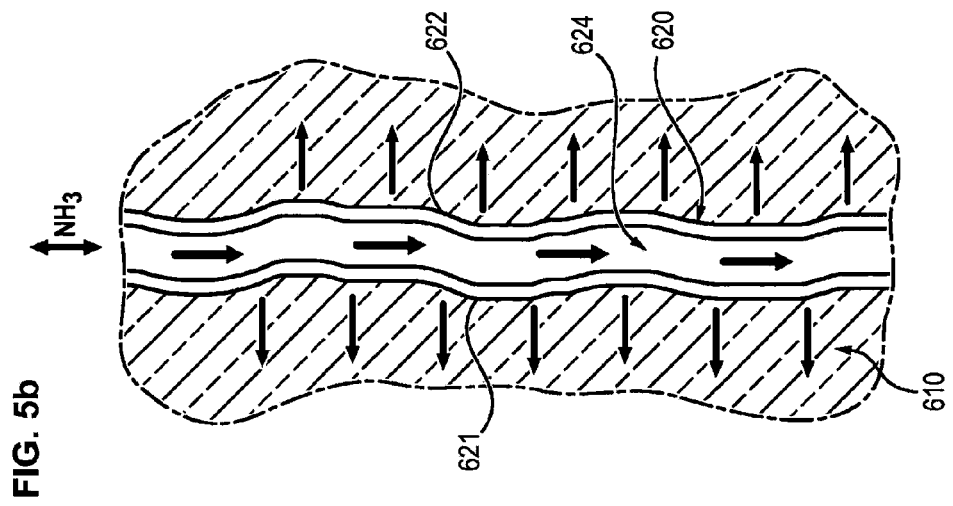
FIGS. 5a and 5b illustrate a particular diffuser allowing gas to be fed into the storage matrix, formed of a film having two flexible porous membranes separating the gas circulation space from the actual porous material.
Figure 5A:
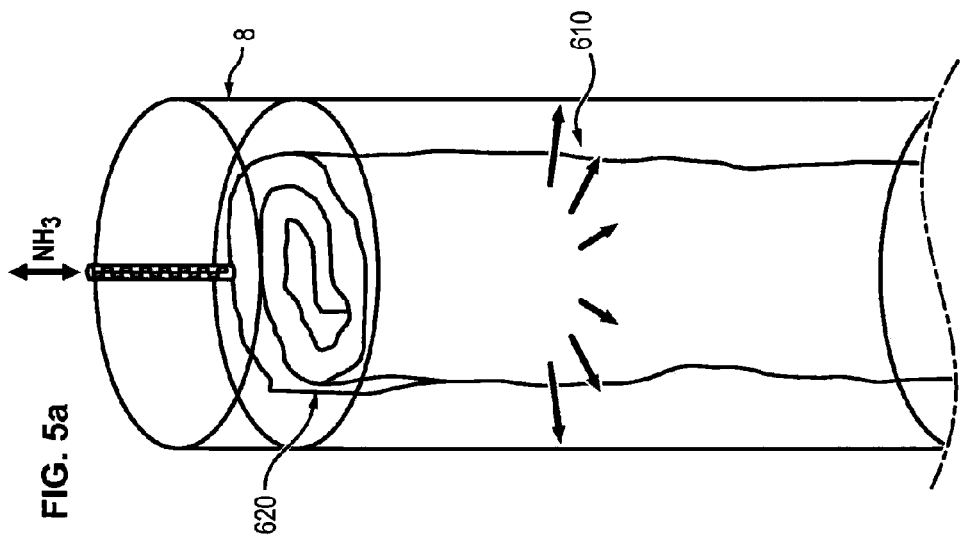

FIGS. 5a and 5b illustrate another embodiment of the invention in which the irrigation means comprise a film 620 located inside the storage structure and formed of two flexible porous membranes 621, 622 being deformable such that they are able to draw away from and draw close to each other within the limits of the deformability allowed by the storage structure. The space 624 between the two membranes communicates with a main channel 602 to input and output the gas to be stored. This membrane is rolled up for example with a space between adjacent turns, and embedded in a porous storage matrix 610 either solid or in powder form.

Depending on the pressure values prevailing inside and outside the membrane respectively, the film assumes different states in which the membranes are drawn away from each other to a greater or lesser extent. At all events, when the storage matrix 610 is heated to deliver ammonia, the ammonia enters the space 624 increasing the pressure therein, the membranes then drawing away from each other to facilitate the circulation of gas towards the main channel 602. Similarly, when filling, the gas pressure applied to the main channel causes the membranes 621, 622 to draw away from one another to facilitate irrigation of the gas towards the core of the storage matrix.

FIGS. 6a and 6b illustrate another embodiment of the membrane irrigation means, in which the storage structure comprises a stack of gas storage elements 710 whether solid or in powder form. In the embodiment shown FIG. 6a, the gas storage elements 710 are directly separated by films 720 with intercalary membranes, each film comprising two porous membranes 721, 722 freely movable in relation to one another within the limits allowed by the over- and underlying elements 710, the inner space 724 thus formed communicating with a main channel 702 for the input and output of ammonia. In the embodiment shown FIG. 6b, the gas storage elements 710, whether solid or in powder form, are separated by intercalary elements 750 whether solid or in powder form which house one or more membrane films 720 as described above, these having regions 730 located above and below the respective film 720 and which can be provided with other functionalities, mechanical or thermal functionalities in particular.

According to another embodiment, not illustrated, the irrigation means may comprise not free spaces essentially free of material (the case in particular of hollow ducts and inter-membrane spaces) but regions of porous material having greater porosity than the storage material itself, these porous spaces creating priority circulating channels for the ammonia, meeting an irrigation function similar to that of the free spaces. It is also possible to provide for a combination of free spaces and spaces having high porosity, with an arrangement allowing optimisation of the mean free movement of gas both for delivery and for refill.

Figure 7:
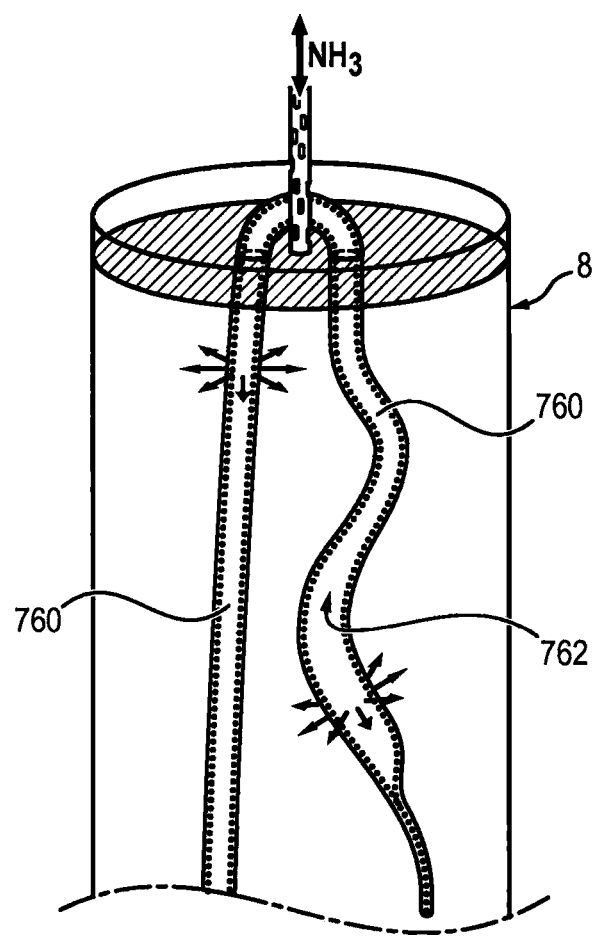
FIG. 7 illustrates a particular diffuser allowing the feeding of gas inside the storage matrix, such that the irrigation means comprise at least one flexible, porous membrane forming a flexible duct.

FIG. 7 illustrates another embodiment of the invention in which the irrigation means comprise a least one flexible, typically porous membrane 760 typically located inside the storage structure, the flexible membrane 760 forming a flexible duct, the flexible membrane 760 typically delimiting an inner space 762 forming a channel, the flexible membrane 760 typically having a cylindrical shape. The storage structure is typically arranged inside the storage chamber 8. The flexible membrane 760 typically has deformability along its longitudinal and/or radial dimension that can be increased or decreased by the volume of the inner space within the limits of deformability allowed by the storage structure. The inner space 762 communicates with a main channel for example to input and output the gas to be stored. The flexible membrane 760 is typically porous and/or permeable to the gas to be diffused, so as to allow the circulation thereof.

The flexible membrane 760 comprises a thin metal felt or woven for example e.g. of coat of mail type. The thin metal felt is made in stainless steel for example. The thin metal felt typically has a mesh size allowing the passing of ammonia whilst being sufficiently narrow to prevent the passing of a powder particle for example used to form the ammonia storage material of the storage structure. For example, if the storage material is made of a salt powder, the mesh size of the felt is typically less than 200 μm.

The flexible membrane 760 typically comprises a metal reinforcement and a thin metal fabric or felt, the fabric or felt preferably being placed around the metal reinforcement. Said metal reinforcement can ensure the solidity and coherence of the irrigation means. Said flexible membrane 760 allows the maintained good irrigation of the structure irrespective of the local density of the porous matrix, said density possibly varying as a function of heat gradients and local ammonia density which may vary further to breathing of the structure when in operation. Said irrigation means can therefore adapt to the porous matrix and to changes thereof as and when used. In addition, said storage means in a region having faster ammonia drainage, would seem to form a channel facilitating the circulation of ammonia from regions still containing ammonia.

6) Modular Structure

FIGS. 8a to 8f illustrate a construction module 80 of an ammonia storage structure such as previously described, said structure typically comprising at least one layer of salt capable of adsorbing or absorbing ammonia, said module 80 comprising irrigation means configured to be connected to irrigation means of at least one other module so as to form a storage structure comprising at least one storage element of a gas such as ammonia in the form of a porous matrix with which irrigation means of the storage element are associated such as previously described. There is therefore the need for only one type of element or a small number of types of different elements of standardised shapes to form storage layers and structures of most varying shape and size comprising at least one storage element of a gas such as ammonia, in the form of a porous matrix with which irrigation means of the storage element are associated. With this standardisation it is possible in particular to make large-scale savings and to obtain simple implementing of the associated processes.

The module may comprise securing means for securing to at least one other module. The irrigation means can be adapted to form securing means. Alternatively or in addition said securing means can be separate from the irrigation means (not illustrated). It is thus possible to obtain a storage structure formed of a storage matrix architecture comprising an assembly of adjacent bricks, optionally having different physicochemical characteristics. Said structure may be in the form of juxtaposed modules stacked edge to edge, e.g. bricks of rectangular parallelepiped shape in contact one with another, or rigid cakes these after manufacture being stacked one on the other forming a tower of variable height.

Figure 8A:
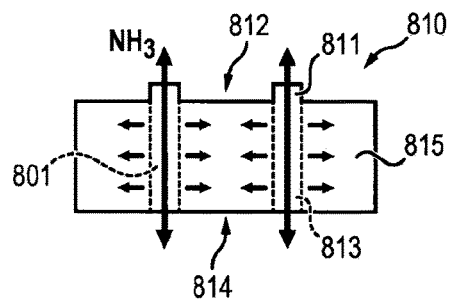
FIGS. 8a to 8f illustrate a construction module of a storage structure, said module comprising irrigation means configured to be connected to irrigation means of at least one other module.

With reference to FIG. 8a, the irrigation means comprise at least one channel 801 or a plurality of separate channels and/or linked to one another. The at least one channel comprises a main channel for example e.g. a central channel passing through the module from one side to another so as to form two openings at two separate ends. The central channel is typically connected to peripheral channels of the module extending from the central channel, the peripheral channels being through or non-through channels.

The at least one channel 801 is typically formed in the same manner as the previously described irrigation means. The at least one channel 801 typically forms part of such irrigation means. The at least one channel 801 typically comprises a tube inserted in a brick in at least one material, typically in an ammonia storage material or thermally conductive material. For example the tube is a metal tube or a polymer tube.

Alternatively, the at least one channel 801 is formed in a brick in at least one material, typically an ammonia storage material or thermally conductive material. The at least one channel 801 is formed by moulding for example or by compression against a mould or by piercing in an already-formed brick. The at least one channel 801 passes through the module 810, typically from one side to another, typically from a first side to a second side of the module 810. The at least one channel comprises at least one part forming securing means. Said securing means comprise a part 811 of channel 801 for example leading outwardly onto a first surface 812 of the module 810, extending for example outwardly from the first surface 812 of the module 810.

The connection means comprise another part 813 of channel for example, so that the shape of part 811 matches the shape of part 813 of the channel 801 leading outwardly onto a second surface 814 of the module 810. This part 811 of the first surface 812 is a projecting part for example, the part 813 of the second surface then forming a hollow region adapted to receive the projection so as to place in fluid connection the irrigation means of two modules and preferably to hold the two modules in contact. The first projecting part 811 may be of slightly larger size than the second hollow part 813 to allow press-fitting. The module 810 may comprise a part in salt 815 adapted to adsorb or absorb the ammonia. Alternatively or in addition, the module 810 may comprise a part in heat conductive material 816.

Figure 8B:
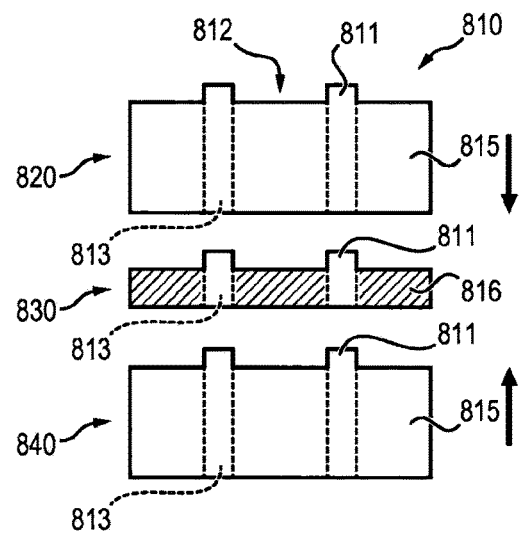

As illustrated in FIG. 8a, the module may be formed of a part in salt 815 in which there extends or there is inserted the at least one channel. Alternatively, the module 10 may be formed of a part in said heat conductive material 16 in which there extends or there is inserted the at least one channel. With reference to FIG. 8b, it is therefore possible to assemble a module 830 in heat conductive material between two modules 820 and 840 in salt 815. It is thus possible easily to obtain a structure comprising alternating layers.

Figure 8C:
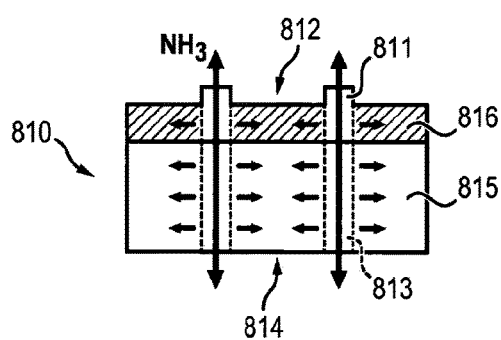
Figure 8D:
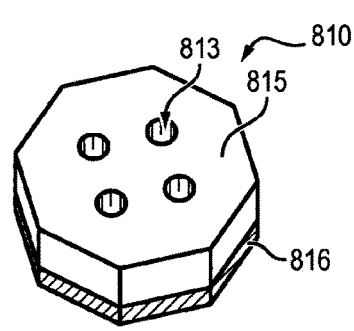
Figure 8E:
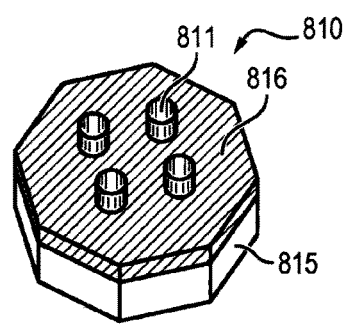

With reference to FIGS. 8c, 8d and 8e, the module 810 may comprise a part in salt 815 able to adsorb or absorb ammonia, and a part in said heat conductive material 816. Said module 810 allows the easy obtaining of a dual-layer structure having alternating salt layers able to adsorb or absorb ammonia and layers of heat conductive material. The salt part 815 capable of adsorbing or absorbing ammonia and the part in said heat conductive material 816 are superimposed on one another for example in the module 810.

The first surface is a surface for example of the salt part 815 and the second surface is for example a surface of the part in said heat conductive material 816. Therefore the part 811 of the first surface 812 of the module 810 is formed for example at the salt part 815, and the part 813 of the second surface 814 of the module 810 is formed for example at the part in said heat conductive material 816, so that at the time of assembling the salt part 815 comes to be secured to a part in said heat conductive material 816 of another module.

The module 810 may have different types of general shapes to allow assembly. The module 810 may have a general cylinder of revolution shape to allow easy stacking. Alternatively, the module 810 may have a general polygonal cylindrical shape e.g. having a regular polygonal base so that it can be assembled onto other modules of same lateral shape to form a checkerboard. It is therefore possible to choose an adapted shape of module to obtain assembled structures of different shapes and different layer organisations.

Figure 8F:
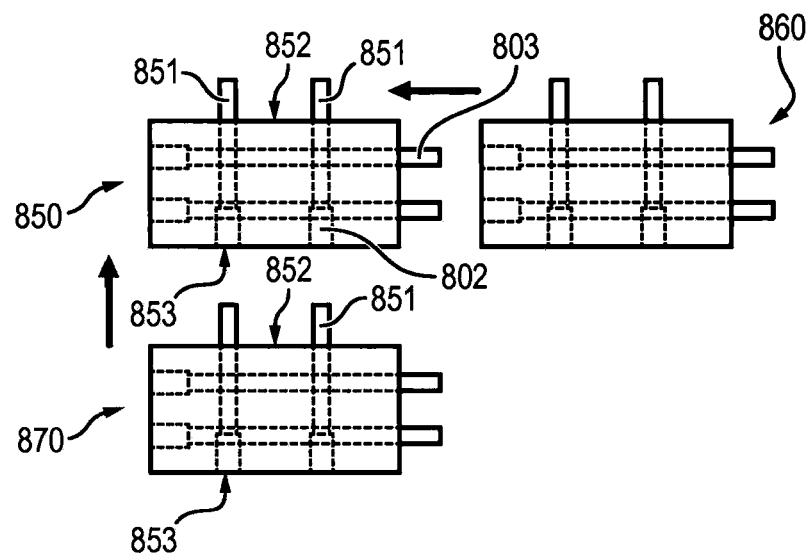

With reference to FIG. 8f, the irrigation means, typically also forming securing means, may comprise at least one element 802 of which one part 851 projects from a first surface 852 of the module 850. For example, the irrigation means may comprise a plurality of such elements 802. The at least one element 802 is capable for example of piercing a second surface 853 of the at least one other module 860 so as to place in fluid connection and optionally secure the two modules to each other.

It is possible to make provision for elements (not illustrated) on a surface of the module 850, which do not extend as far as the matching surface of the same module, this latter surface subsequently being pierced. In this manner large-scale savings can be made. Additionally, said securing between modules can ensure the holding together of the assembly in particular when the pierced surface is made of salt which lends itself to this securing by piercing.

The at least one projecting element 851 is formed for example by at least one tube attached by insertion through the first surface 852 of the module. The module can therefore be easily obtained by fixing the tubes in a block in at least one constituent material of the structure to be built, so as to form the module. The first surface 852 is a surface for example of a part in salt and/or in said heat conductive material of the module 850.

The module can easily be formed by fixing the rods in a block comprising or formed by the salt or said heat conductive material, for example a salt part capable of adsorbing or absorbing ammonia or a part in said heat conductive material. In this manner a module 820 can easily be obtained comprising said elements 802, 803 on several surfaces of the module 20. The elements 802 may have through orifices for example, to allow the passing of other elements 803 passing through the module 850 in other directions, for example so that the irrigation means form a network extending in several dimensions inside the module 850. In particular, it is thus possible easily to obtain a module 820 allowing assembly in several directions for example a vertical assembly between module 850 and a module 870, and horizontal assembly between module 850 and a module 860.

7) Module Manufacturing Method

Figure 9:
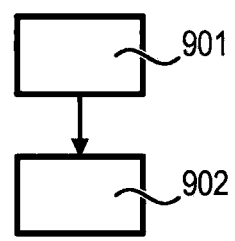
FIG. 9 illustrates an example of a method to manufacture the storage module.

FIG. 9 illustrates an example of a method to manufacture a said storage module. The method comprises a first step 901 to compress a powder e.g. a powder bed inside a mould so as to form a coherent block. Compression is typically performed by applying a piston actuated by a dedicated press.

The method comprises a second step 902 to form a network of irrigation channels inside the coherent block so as to obtain the construction module. Said network is obtained for example by hollowing out material from at least one surface of the coherent block, typically from the different outer surfaces of the coherent block intended to be placed in contact with modules. This hollowing of material is typically performed directly from the mould/piston system or alternatively by etching.

8) Method to Obtain a Structure from Modules

The method comprises a step to assemble at least two construction modules to form an assembly of modules. The step is typically performed so that the irrigation means particular to each module are connected from one module to another. The connected irrigation means can therefore form a coherent network for example allowing gas to circulate from inside the storage matrix to outside the storage structure and vice versa.

The present invention is evidently in no way limited to the embodiments described above and illustrated in the drawings; it is within the reach of the person skilled in the art to make numerous modifications thereto and to obtain variants thereof.

The invention claimed is:

1. A storage structure comprising at least one storage element of a gas in the form of a porous matrix, to which an irrigation network of the storage element is associated,
   i) wherein the irrigation network comprises a main channel extending along an axis of a container receiving a stack of wafers held in position by a wall of the container, the wafer comprising storage elements alternating with intercalary elements, the intercalary elements comprising a star-shaped network of irrigation channels starting from a central opening taking part in the main channel, so that the intercalary elements form a secondary irrigation network starting from the main channel, to facilitate circulation of gas towards and from the storage elements, or
   ii) wherein the irrigation network comprise a film located inside the storage structure and formed of two flexible porous membranes being deformable such that they are able to draw away from and draw close to each other within the limits of the deformability allowed by the storage structure,
wherein the space between the two membranes communicates with a main channel to input and output the gas to be stored,
   wherein,
   depending on the pressure values prevailing inside and outside the membrane respectively, the film assumes different states in which the membranes are drawn away from each other to a greater or lesser extent,
   when the storage matrix is heated to deliver gas, the gas enters the space increasing the pressure therein, the membranes then drawing away from each other to facilitate the circulation of gas towards the main channel,
   when filling, the gas pressure applied to the main channel causes the membranes to draw away from one another to facilitate irrigation of the gas towards the core of the storage matrix.

2. The structure according to claim 1, wherein at least part of the irrigation network is arranged inside the storage element.

3. The structure according to claim 1, wherein at least part of the irrigation network is arranged inside an irrigation element adjacent the storage element.

4. The structure according to claim 1, wherein the irrigation network comprises one or more channels essentially devoid of porous material.

5. The structure according to claim 4, wherein the channels comprise tubes having a wall provided with orifices and wherein the channels comprise tubes having a porous wall.

6. The structure according to claim 1, wherein the irrigation network comprises one or more channels formed in a porous matrix and defined by regions of the porous matrix having greater porosity than the remainder of the matrix.

7. The structure according to claim 6, wherein the porous matrix in which the channel(s) are formed is the matrix of the storage element, and wherein the porous matrix in which the channel(s) are formed is the matrix of an intercalary element between two storage elements.

8. The structure according to claim 6, wherein the porous matrix in which the channel(s) are formed is rigid, or wherein the porous matrix in which the channel(s) are formed is in powder form.

9. The structure according to claim 1, wherein the irrigation network comprises at least two channels according to a ramified arrangement.

10. The structure according to claim 1, wherein the irrigation network comprises a film formed by two porous membranes and delimiting a space therebetween.

11. The structure according to claim 1, wherein the irrigation network comprises at least one flexible membrane forming a flexible duct.

12. The structure according to claim 1, wherein the irrigation network comprises two plates provided with orifices and spaced apart, intercalated between two gas storage elements.

13. The storage structure of claim 12, wherein the two plates delimit an intercalary space free of solid material, each plate being provided with a series of holes ensuring communication between the space and the porous storage matrix formed by the storage elements.

14. The storage structure of claim 13, wherein the plates are held in position by crimping on a duct forming a main channel.

15. The structure according to claim 1, wherein the irrigation network extends from a main channel passing through the gas storage element(s).

16. A construction module of the structure according to claim 1, the module comprising the irrigation network configured to be connected to the irrigation network of at least one other module to form the storage structure.

17. A storage and delivery system for vehicles, comprising the at least one storage element which comprises the storage structure according to claim 1.

18. A selective catalytic reduction system for the exhaust gases of an internal combustion engine, wherein it comprises the ammonia storage system according to claim 17 and an injection module to inject the ammonia into the exhaust gases.

19. The storage structure according to claim 1, for selective catalytic reduction of nitrogen oxides in exhaust gases of combustion structure vehicles.

20. The storage structure of claim 1, wherein the gas is ammonia gas.

21. The storage structure according to claim 1, wherein at least part of the irrigation network is arranged inside an irrigation element adjacent the storage element.

22. The storage structure of claim 1, wherein the irrigation network comprises a series of ducts and cross-shaped junction elements, so that the ducts cross over one another at the cross-shaped junction elements.

23. The storage structure of claim 1, wherein the irrigation channels are connected to other channels via cross-shaped connection elements.

24. The storage structure of claim 1, wherein the storage structure comprises a stack of gas storage elements, wherein the gas storage elements are directly separated by films with intercalary membranes, each film comprising two porous membranes freely movable in relation to one another within the limits allowed by the over and underlying storage elements, an inner space thus formed communicating with a main channel for the input and output of gas.

25. The storage structure of claim 1, wherein the irrigation network comprises at least one flexible, porous membrane located inside the storage structure, the flexible membrane forming a flexible duct, the flexible membrane delimiting an inner space forming a channel, the flexible membrane having a cylindrical shape, wherein the flexible membrane is deformable along its longitudinal and/or radial dimension that can be increased or decreased by the volume of the inner space within the limits of deformability allowed by the storage structure.

26. The structure of claim 25, wherein the flexible membrane comprises a thin metal felt or woven material, having a mesh size allowing the passing of gas and being sufficiently narrow to prevent the passing of a powder particle used to form the storage material of the storage structure.

27. The storage structure of claim 1, wherein said structure is in the form of juxtaposed modules stacked edge to edge, each module comprising an irrigation network configured to be connected to an irrigation network of at least one other module so as to form a storage structure, the irrigation network of each module securing the module to at least one other module.

28. A method for manufacturing a module comprising: compressing a powder inside a mould, to form a coherent block; and forming a network of irrigation channels inside the coherent block to obtain the module, the module comprising at least one storage element of a gas in the form of a porous matrix, i) wherein the network of irrigation channels comprises a main channel extending along an axis of a container receiving a stack of wafers held in position by a wall of the container, the wafer comprising storage elements alternating with intercalary elements, the intercalary elements comprising a star-shaped network of irrigation channels starting from a central opening taking part in the main channel, so that the intercalary elements form a secondary irrigation network starting from the main channel, to facilitate circulation of gas towards and from the storage elements, or ii) wherein the network of irrigation channels comprises a film located inside the module and formed of two flexible porous membranes being deformable such that they are able to draw away from and draw close to each other within the limits of the deformability allowed by the module, wherein the space between the two membranes communicates with a main channel to input and output the gas to be stored, wherein, depending on the pressure values prevailing inside and outside the membrane respectively, the film assumes different states in which the membranes are drawn away from each other to a greater or lesser extent, when the storage matrix is heated to deliver gas, the gas enters the space increasing the pressure therein, the membranes then drawing away from each other to facilitate the circulation of gas towards the main channel, when filling, the gas pressure applied to the main channel causes the membranes to draw away from one another to facilitate irrigation of the gas towards the core of the storage matrix.

29. A monolithic porous matrix to store gas including irrigation means to promote the sorption/desorption of the gas within the matrix, wherein said porous matrix includes at least one storage element of a gas in the form of said porous matrix i) wherein the irrigation means comprises a main channel extending along an axis of a container receiving a stack of wafers held in position by a wall of the container, the wafer comprising storage elements alternating with intercalary elements, the intercalary elements comprising a star-shaped network of irrigation channels starting from a central opening taking part in the main channel, so that the intercalary elements form a secondary irrigation network starting from the main channel, to facilitate circulation of gas towards and from the storage elements, or ii) wherein the irrigation means comprise a film located inside the porous matrix and formed of two flexible porous membranes being deformable such that they are able to draw away from and draw close to each other within the limits of the deformability allowed by the porous matrix, wherein the space between the two membranes communicates with a main channel to input and output the gas to be stored, wherein, depending on the pressure values prevailing inside and outside the membrane respectively, the film assumes different states in which the membranes are drawn away from each other to a greater or lesser extent, when the storage matrix is heated to deliver gas, the gas enters the space increasing the pressure therein, the membranes then drawing away from each other to facilitate the circulation of gas towards the main channel, when filling, the gas pressure applied to the main channel causes the membranes to draw away from one another to facilitate irrigation of the gas towards the core of the storage matrix.

* * * * *